(12) United States Patent
Zhang et al.

(10) Patent No.: US 11,804,636 B2
(45) Date of Patent: Oct. 31, 2023

(54) ELECTRODE ASSEMBLY AND BATTERY WITH ELECTRODE TAB

(71) Applicant: Dongguan Amperex Technology Limited, Guangdong (CN)

(72) Inventors: Yanan Zhang, Guangdong (CN); Chao Yang, Guangdong (CN); Wenwei Yin, Guangdong (CN); Chunhua Bian, Guangdong (CN)

(73) Assignee: Dongguan Amperex Technology Limited, Dongguan (CN)

(*) Notice: Subject to any disclaimer, the term of this patent is extended or adjusted under 35 U.S.C. 154(b) by 174 days.

(21) Appl. No.: 16/502,029

(22) Filed: Jul. 3, 2019

(65) Prior Publication Data

US 2020/0212408 A1  Jul. 2, 2020

(30) Foreign Application Priority Data

Jan. 2, 2019  (CN) .......................... 201910001479.3

(51) Int. Cl.
*H01M 50/46* (2021.01)
*H01M 50/572* (2021.01)
(Continued)

(52) U.S. Cl.
CPC ......... *H01M 50/46* (2021.01); *H01M 50/536* (2021.01); *H01M 50/538* (2021.01); *H01M 50/572* (2021.01)

(58) Field of Classification Search
CPC ............................ H01M 50/531; H01M 50/46
See application file for complete search history.

(56) References Cited

U.S. PATENT DOCUMENTS

| | | | |
|---|---|---|---|
| 2004/0028999 A1* | 2/2004 | Richard | H01M 10/0436 429/149 |
| 2011/0052976 A1* | 3/2011 | Ishii | H01M 50/538 429/178 |

(Continued)

FOREIGN PATENT DOCUMENTS

| | | |
|---|---|---|
| CN | 101454925 A | 6/2009 |
| CN | 206332097 U | 7/2017 |

(Continued)

OTHER PUBLICATIONS

Extended European Search Report dated May 6, 2020, issued in counterpart EP application No. 19186650.8. (7 pages).

(Continued)

*Primary Examiner* — Jimmy Vo
(74) *Attorney, Agent, or Firm* — WHDA, LLP

(57) ABSTRACT

One aspect of the present application provides an electrode assembly, including a first electrode plate, a second electrode plate, and a separator disposed therebetween. The first electrode plate and the second electrode plate are wound or stacked to form the electrode assembly. Wherein the electrode assembly further includes a first electrode tab disposed on the first electrode plate, and an insulating layer including a first portion disposed on the first electrode plate. And, no second electrode plate is disposed between the first portion and the first electrode tab. The present application also provides a battery. The present application intends to at least improve the safety performance of the battery.

20 Claims, 3 Drawing Sheets

(51) Int. Cl.
*H01M 50/538* (2021.01)
*H01M 50/536* (2021.01)

(56) References Cited

U.S. PATENT DOCUMENTS

| | | | |
|---|---|---|---|
| 2011/0244312 A1 | 10/2011 | Tani et al. | |
| 2012/0202105 A1* | 8/2012 | Shinyashiki | H01M 50/528 |
| | | | 429/153 |
| 2017/0084901 A1* | 3/2017 | Doo | H01M 50/538 |

FOREIGN PATENT DOCUMENTS

| | | |
|---|---|---|
| CN | 107408659 A | 11/2017 |
| CN | 206619640 U | 11/2017 |
| JP | 2011-210662 A | 10/2011 |
| JP | 2013171618 A | 9/2013 |
| JP | 2017-188371 A | 10/2017 |
| KR | 20080090753 A | 10/2008 |

OTHER PUBLICATIONS

Office Action dated Aug. 24, 2020, issued in counterpart JP application No. 2019-128370, with English translation. (8 pages).

\* cited by examiner

ELECTRODE ASSEMBLY AND BATTERY WITH ELECTRODE TAB

CROSS-REFERENCE TO RELATED APPLICATION

This application claims priority to and benefits of Chinese Patent Application Serial No. 201910001479.3, filed with the China National Intellectual Property Administration on Jan. 2, 2019, the entire content of which is incorporated herein by reference.

FIELD OF THE INVENTION

The present application relates to the field of batteries, in particular, to an electrode assembly and a battery.

BACKGROUND OF THE INVENTION

At present, the demand for high-rate charge and discharge batteries is increasing, and the application of multi-layer electrode tabs is becoming wider and wider. The multi-tab wound structure is currently widely used in batteries, and its multi-tab structure enables parallel connection between the layers of the wound cells. Compared with the conventional mono-tab battery, the internal resistance of the wound cell using the multi-tab structure is greatly reduced, and the dynamic performance of the battery can be significantly improved, such as improvement of charge and discharge rate, temperature rise and low temperature discharge.

The multi-tab is made of metal and cannot be packaged directly with the package, an adapter electrode tab is required, which is provided with an electrode tab adhesive that is fused with the package through heat fusion, and the adapter electrode tab is soldered with the electrode tab.

The method for adapting the electrode tab in current multi-tab lithium battery requires a large battery space and causes the energy density to be reduced. Moreover, manual application of adhesive is required, so automatic production cannot be realized, and there are problems such as low efficiency, high manufacturing cost, and quality stability depending on people. Therefore, it is necessary to improve the way in which the electrode tab adhesive of the multi-tab structure is applied.

SUMMARY OF THE INVENTION

For the problems in the related art, the present application intends to provide an electrode assembly and a battery, so as to improve the safety performance of the battery.

According to one aspect of present application, an electrode assembly including a first electrode plate, a second electrode plate and a separator disposed therebetween is provided. The first electrode plate and the second electrode plate are wound or stacked to form the electrode assembly. Wherein the electrode assembly further includes a first electrode tab disposed on the first electrode plate, and an insulating layer including a first portion disposed on the first electrode plate. No second electrode plate is disposed between the first portion and the first electrode tab.

According to another aspect of present application, a battery including an electrode assembly and a housing for receiving the electrode assembly is provided. Wherein the electrode assembly includes a first electrode plate, a second electrode plate and a separator disposed therebetween. The first electrode plate and the second electrode plate are wound or stacked to form the electrode assembly. Wherein the electrode assembly further includes a first electrode tab disposed on the first electrode plate, and an insulating layer including a first portion disposed on the first electrode plate. No second electrode plate is disposed between the first portion and the first electrode tab.

The present application has the following beneficial technical effects:

A novel electrode tab introducing method is provided to save space, increase energy density, and provide superior safety, as compared with the prior process. The novel electrode tab introducing method may effectively reduce the risk of cell corrosion, internal short circuit, etc. The present application further provides a novel adhesive application method for replacing the current manual adhesive application method, so that the improved adhesive application method may achieve the automation or semi-automation for the adhesive application, thereby reducing manufacturing costs and solving the problem of low automation and quality stability caused by the existing adhesive application method.

DETAILED DESCRIPTION OF THE EMBODIMENTS

The present application will be further described below in conjunction with FIGS. 1 to 3.

Figure 1:
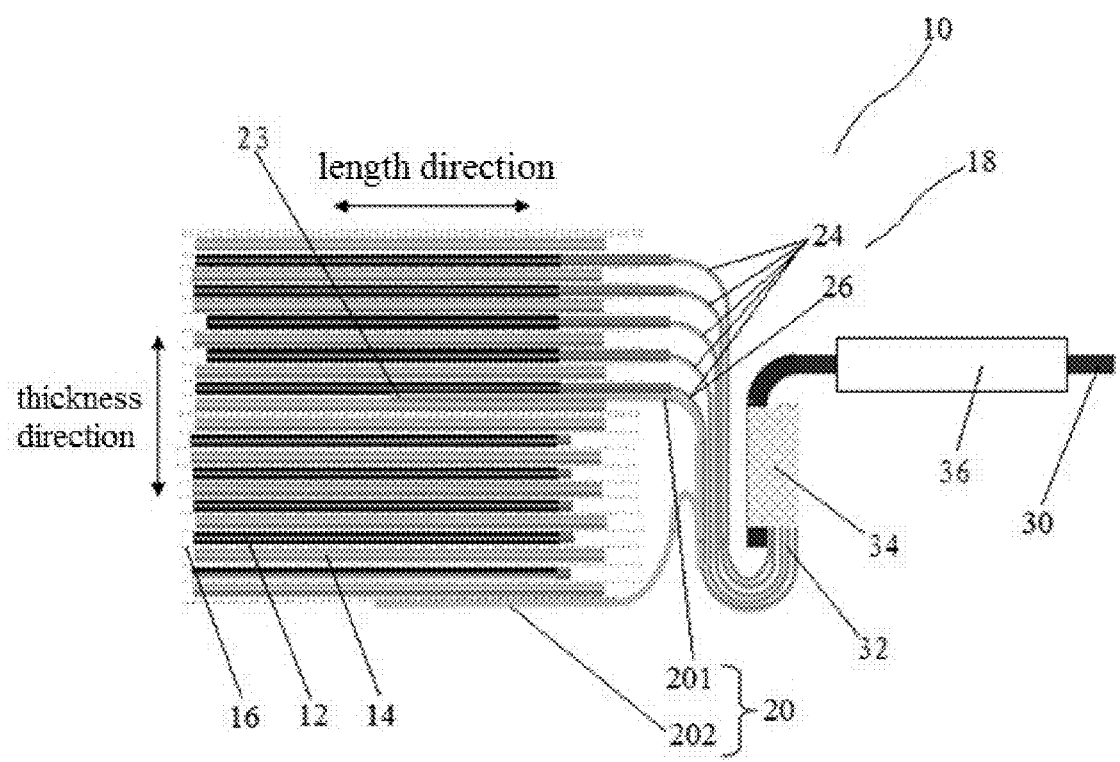
FIG. 1 is a schematic cross-sectional view of an electrode assembly according to an embodiment of the present application.
Figure 2:
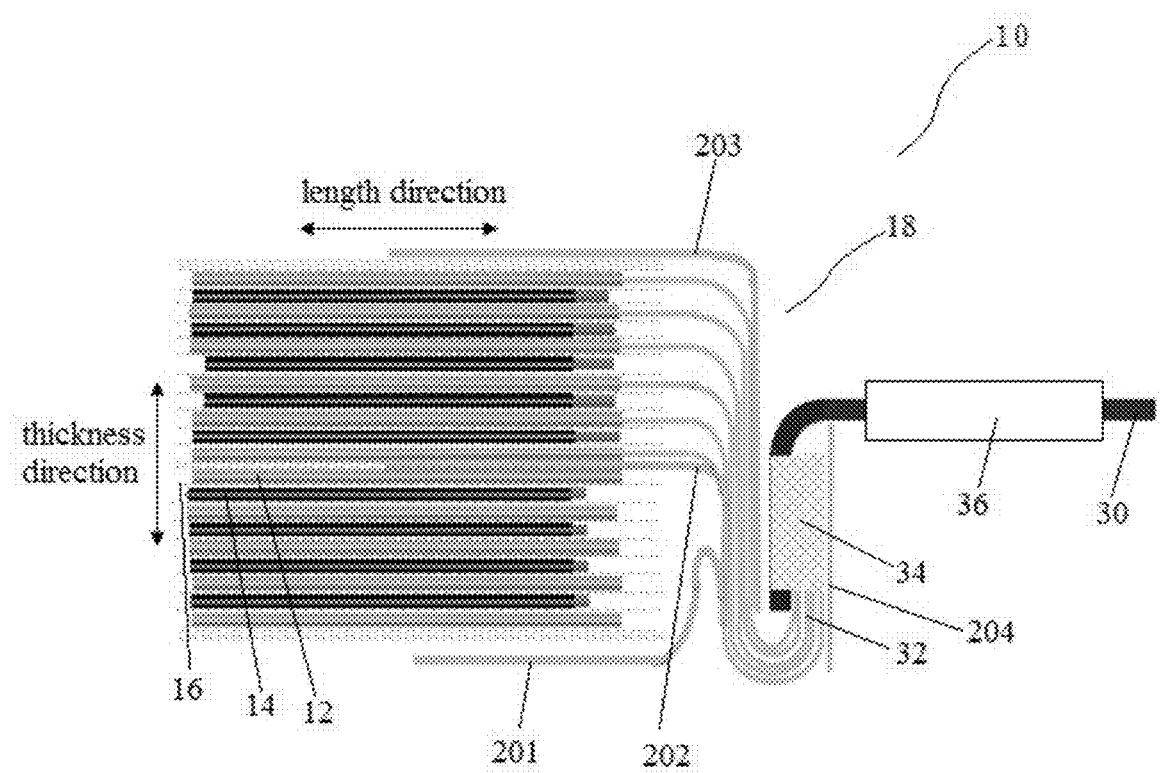
FIG. 2 is a schematic cross-sectional view of an electrode assembly according to another embodiment of the present application.

FIG. 1 illustrates a schematic cross-sectional view of an electrode assembly 10 according to an embodiment of the present application, which includes a first electrode plate 12, a second electrode plate 14, and a separator 16 disposed between the first electrode plate 12 and the second electrode plate 14. The first electrode plate 12 and the second electrode plate 14 are wound to form the electrode assembly 10, and the first electrode plate 12 and the second electrode plate 14 may also be alternately stacked to form the electrode assembly 10. In an embodiment, the electrode assembly 10 further includes a first electrode tab 18 disposed on the first electrode plate 12, and an insulating layer 20 including a first portion 201 disposed on the first electrode plate 12, no second electrode plate 14 being disposed between the first portion 201 and the first electrode tab 18. In other words, the insulating layer 20 is disposed between the first electrode tab 18 and the second electrode plate 14 to achieve a better isolation effect, preventing the occurrence of an internal short circuit of the battery.

In an embodiment of the present application, the insulating layer 20 may be an adhesive tape or an insulating coating. The first portion 201 has a first end portion 23 and a second end portion disposed opposite the first end portion 23, and the first end portion 23 extends inside of the electrode assembly 10 to prevent the first end portion 23 itself from falling off. The installation of the first end portion 23 can be implemented by the gluing department of the winding machine during winding.

According to an embodiment of the present application, the first electrode tab 18 includes a plurality of first electrode tab units 24, and the plurality of first electrode tab units 24 includes an innermost first electrode tab unit 26 adjacent to the insulating layer 20. Wherein, no second electrode plate 14 is disposed between the insulating layer 20 and the innermost first electrode tab unit 26. In other words, the embodiment of the present application is applicable to a multi-tab electrode assembly, which may effectively prevent the first electrode tab 18 and the second electrode plate 14 from contacting, thereby reducing the risk of internal short circuit.

In an embodiment of the present application, the first electrode tab 18 may only have one first electrode tab unit, the first portion 201 of the insulating layer 20 is disposed on the first portion 201 of the first electrode plate 12. And, no second electrode plate 14 is disposed between the first portion 201 and the first electrode tab 18. The provision of the insulating layer prevents the first electrode tab 18 from contacting the second electrode plate 14, which may result in an internal short circuit.

According to an embodiment of the present application, an orthographic projection of the insulating layer 20 covers an orthographic projection of the first electrode tab 18 in a thickness direction of the electrode assembly 10. That is to say, the insulating layer 20 extends beyond the first electrode tab 18 toward the main body of the electrode assembly in a length direction of the electrode assembly 10, and a width of the insulating layer 20 is greater than a width of the first electrode tab 18 in a width direction of the electrode assembly 10. Among them, the width direction of the electrode assembly 10 is perpendicular to a plane formed by the length direction and the thickness direction.

According to an embodiment of the present application, the first electrode tab 18 includes a plurality of first electrode tab units 24 disposed in a stack. And the plurality of first electrode tab units 24 includes an innermost first electrode tab unit 26 adjacent to the insulating layer 20. Wherein, no second electrode plate 14 is disposed between the insulating layer 20 and the innermost first electrode tab unit 26. The width of the insulating layer 20 is greater than the width of the first electrode tab 18 in the width direction of the electrode assembly. In other words, the insulating layer 20 has a width sufficient to achieve better isolation between the first electrode tab 18 and the second electrode plate 14. The insulating layer 20 penetrates the main body of the electrode assembly 10 in the length direction of the electrode assembly 10 to prevent falling off.

According to an embodiment of the present application, the first electrode tab 18 includes a plurality of first electrode tab units 24 disposed in a stack. The plurality of first electrode tab units 24 includes an innermost first electrode tab unit 26 adjacent to the insulating layer 20, and the insulating layer 20 further includes a second portion 202 disposed on an outer surface of the electrode assembly 10. The installation of the second portion 202 can be implemented with the cooperation of the automatic tab welding machine after the winding is completed, thereby realizing the automatic production of the adhesive application.

According to an embodiment of the present application, the second portion 202 partially overlaps the first portion 201. The second portion 202 partially overlaps the first portion 201 to achieve better isolation between the first electrode tab 18 and the second electrode plate 14. In an embodiment, the insulating layer 20 at least partially covers the first electrode tab 18 in the length direction of the electrode assembly 10.

According to an embodiment of the present application, the first electrode tab 18 includes a tail segment 32 located outside the electrode assembly 10 and soldered to an adapter electrode tab 30, wherein the tail segment 32 extends in the thickness direction of the electrode assembly 10. The insulating layer 20 covers the tail segment 32. In an embodiment, the electrode assembly 10 includes an upper portion and a lower portion. Wherein the first electrode tab 18 is disposed on the first electrode plate 12 of the upper portion and extends parallel to the length direction of the electrode assembly 10, bends for the first time toward the lower portion of the electrode assembly 10 after exceeding the main body of the electrode assembly 10, and then bends for the second time away from the lower portion of the electrode assembly 10 and toward the upper portion. In an embodiment, an angle at which the bending occurs for the first time is about 90 degrees, and an angle at which the bending occurs for the second time is about 180 degrees. The first electrode tab 18 is welded to the adapter electrode tab 30 to form a welding region 34 after bending for the second time. The welding may be ultrasonic welding or other welding suitable for actual production. With such an arrangement, the welding region 34 is transited from an existing flat state to a vertical state, thereby reducing the space occupied by the electrode tab welding region 34 and increasing the energy density of the electrode assembly.

According to an embodiment of the present application, the insulating layer 20 further includes a third portion 203 disposed on an outermost first electrode tab unit of the first electrode tab 18. The third portion 203 extends to the outer surface of the electrode assembly 10 in the length direction of the electrode assembly 10, and extends to a portion that is substantially close to the portion where the bending occurs for the second time along the outermost first electrode tab unit. So as to separate the welding region 34 from the multi-tab body structure. Among which, the outermost first electrode tab unit is a first electrode tab unit disposed at the outermost portion of the electrode assembly 10, corresponding to the innermost first electrode tab unit 26.

According to an embodiment of the present application, the first electrode plate 12 is either one of a cathode plate or an anode plate, and correspondingly, the second electrode plate 14 is the other of the cathode plate or the anode plate. And, the first electrode tab 18 and the second electrode tab do not overlap in the thickness direction of the electrode assembly. FIG. 1 shows an embodiment in which the first electrode plate 12 is a cathode plate, and FIGS. 2 and 3 show an embodiment in which the first electrode plate 12 is an anode plate. In other embodiments, similar to the first electrode plate 12, a second electrode tab is further disposed on the second electrode plate 14, the insulating layer 20 may further be disposed on the second electrode plate 14, and there is no first electrode plate 12 between the insulating layer 20 and the second electrode tab 14. In other words, the insulating layer 20 may be disposed between the cathode tab and the anode plate, and between the anode tab and the cathode plate, simultaneously, to achieve a better isolation effect, preventing the occurrence of an internal short circuit of the battery.

Referring to FIG. 1, according to an embodiment of the present application, an edge of the cathode may be provided with a cathode insulating protective layer with a thickness lower than that of the cathode plate; and the cathode insulating protective layer extends beyond an anode active substance layer in the length direction of the cell. The cathode insulating protective layer may be used to protect the cathode current collector empty foil region and prevent the aluminum foil from short-circuiting with the anode active substance layer. Of course, the cathode insulating protective layer is optional. That is to say, the edge of the cathode plate may not be provided with a cathode insulating protective layer.

Figure 3:
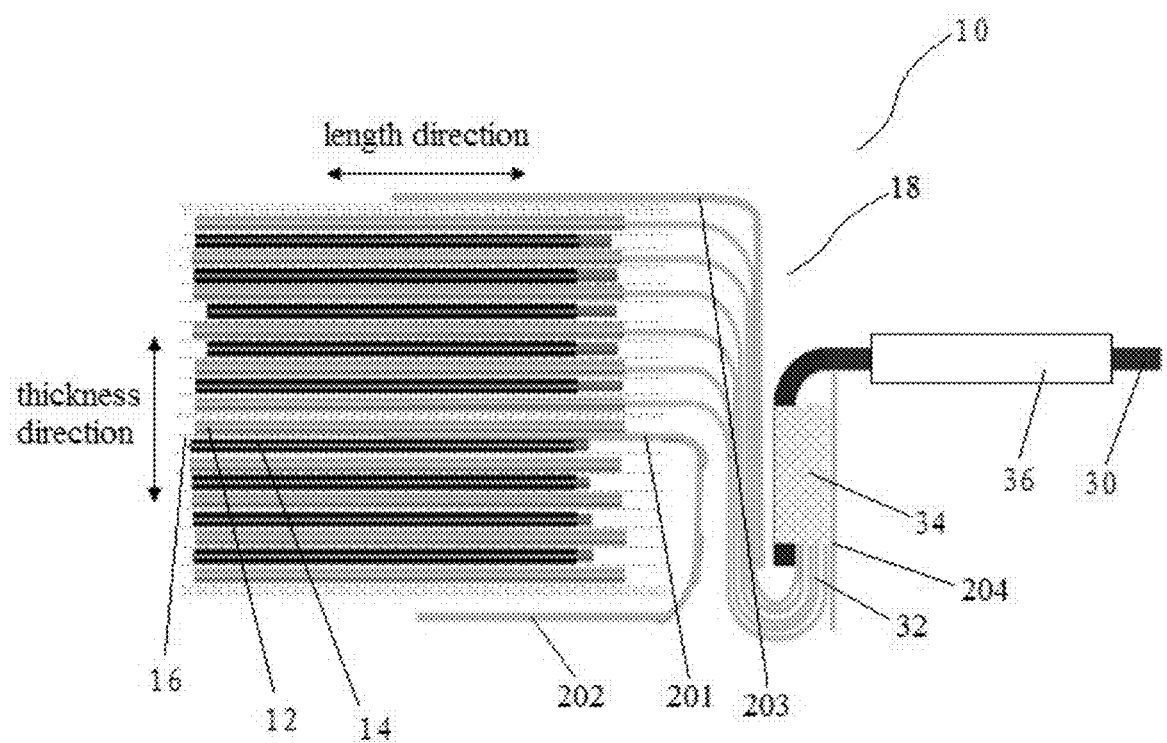
FIG. 3 is a schematic cross-sectional view of an electrode assembly according to still another embodiment of the present application.

According to an embodiment of the present application, specifically referring to FIG. 3, the first electrode plate 12 is disposed between the insulating layer 20 and the first electrode tab 18. In other words, the first portion 201 of the insulating layer 20 may be adhered to the second electrode plate 14 adjacent to the first electrode plate 12, and the first portion 201 and the second portion 202 may constitute a monolithic insulating layer 20. The first portion 201 penetrates the main body of the electrode assembly 10 to prevent the first end portion 23 itself from falling off. And, the installation of the first portion 201 may be completed by the gluing department of the winding machine during winding, while reserving the second portion 202 with a sufficient length, so that the second portion 202 may be adhered to the outer surface of the electrode assembly 10. The second portion 202 may be adhered to the outer surface of the electrode assembly 10 through a manual wrapping method after the winding is completed. Therefore, semi-automation of the adhesive application is achieved.

The first electrode tab 18 may be first gathered in the direction of the lower portion of the electrode assembly and then cut, so as to ensure that the head of the first electrode tab 18 is neat during welding. Referring to FIGS. 2 and 3, the insulating layer 20 further includes a fourth portion 204 disposed on the surface of the welding region 34. The fourth portion 204 is adhered on the surface of the welding region 34 after the welding. And, the third portion 203 is adhered to the surface of the electrode assembly, so as to prevent the inner short circuit caused by the solder burr or the like coming into contact with the battery housing after penetrating the separator. After the insulating layer 20 is disposed, the first electrode tab 18 and the adapter electrode tab 30 are bent and shaped. The provision of the insulating layer 20 may reduce the possibility that the bent first electrode tab 18 or the welding region 34 contact with the electrode plate of the lower portion of the electrode assembly 10, so as to prevent the inner short circuit.

Another aspect of the present application provides a battery including the electrode assembly 10 and a housing for receiving the electrode assembly 10, wherein the electrode assembly 10 is the electrode assembly 10 of any of the above embodiments. The adapter electrode tab 30 extends out of the housing and is connected to the housing by a sealant 36.

In the present application, the adhesive is applied in the region where the electrode tab is bent in the electrode assembly of the multi-layer electrode tab structure to prevent short circuit inside the battery, thereby effectively improves the safety performance of battery. And, in order to reduce the excessive space in the battery head occupied by the welding region of the electrode tab, a method of folding the electrode tab into a U shape to transit the welding region 34 from a flat state to a vertical state is adopted in the present application. Thereby, reduces the space occupied by the welding region 34 of the electrode tab and increases the energy density of the battery cell. Meanwhile, the structure of the electrode assembly 10 of the present application is equipped with a winding mechanism with an adhesive application function, and equipped with an automatic electrode tab welding machine, so that automated or semi-automated production for the adhesive application may be achieved.

The foregoing is merely illustrative of the preferred embodiments of the present application and is not intended to be limiting of the present application, and various changes and modifications may be made by those skilled in the art. Any modifications, equivalent substitutions, improvements, and the like within the spirit and principles of the application are intended to be included within the scope of the present application.

What is claimed is:

1. An electrode assembly, comprising a first electrode plate, a second electrode plate, and a separator disposed therebetween, and the first electrode plate and the second electrode plate being wound or stacked to form the electrode assembly having a multi-tab structure with parallel connection between adjacent wound or stacked layers, an innermost portion of the first electrode plate defining an innermost portion of the electrode assembly;
wherein the electrode assembly further comprises:
a first electrode tab disposed on the first electrode plate at the innermost portion of the electrode assembly; and
an adhesive tape comprising a first portion disposed on the first electrode plate at the innermost portion of the electrode assembly,
the first portion having a first end portion extending inside of the electrode assembly and being provided between the first electrode tab and the second electrode plate,
the adhesive tape having a second portion disposed on an outer surface of the electrode assembly,
and no second electrode plate being disposed between the first portion and the first electrode tab.

2. The electrode assembly according to claim 1, wherein the first electrode tab comprises a plurality of first electrode tab units, and the plurality of first electrode tab units comprises an innermost first electrode tab unit adjacent to the adhesive tape; and no second electrode plate is disposed between the adhesive tape and the innermost first electrode tab unit.

3. The electrode assembly according to claim 2, wherein an orthographic projection of the adhesive tape covers an orthographic projection of the first electrode tab in a thickness direction of the electrode assembly.

4. The electrode assembly according to claim 1, wherein the first electrode tab comprises a plurality of first electrode tab units disposed in a stack, and the plurality of first electrode tab units comprises an innermost first electrode tab unit adjacent to the adhesive tape;
no second electrode plate is disposed between the adhesive tape and the innermost first electrode tab unit; and
a width of the adhesive tape is greater than a width of the first electrode tab in a width direction of the electrode assembly.

5. The electrode assembly according to claim 1, wherein the first electrode tab comprises a plurality of first electrode tab units disposed in a stack, and the plurality of first electrode tab units comprises an innermost first electrode tab unit adjacent to the adhesive tape.

6. The electrode assembly according to claim 5, wherein the second portion partially overlaps the first portion.

7. The electrode assembly according to claim 1, wherein the adhesive tape at least partially covers the first electrode tab in a length direction of the electrode assembly.

8. The electrode assembly according to claim 1, wherein the first electrode plate is disposed between the adhesive tape and the first electrode tab.

9. The electrode assembly according to claim 1, wherein the first electrode tab comprises a tail segment extending beyond the electrode assembly and used for soldering to an adapter electrode tab, wherein the tail segment extends in a thickness direction of the electrode assembly; and the adhesive tape covers the tail segment.

10. The electrode assembly according to claim 1, wherein the first electrode plate is either one of a cathode plate or an anode plate, and the second electrode plate is the other of the cathode plate or the anode plate.

11. A battery, comprising an electrode assembly and a housing receiving the electrode assembly,
wherein the electrode assembly comprises a first electrode plate, a second electrode plate and a separator disposed therebetween, and the first electrode plate and the second electrode plate being wound or stacked to form the electrode assembly having a multi-tab structure with parallel connection between adjacent wound or stacked layers, an innermost portion of the first electrode plate defining an innermost portion of the electrode assembly;
wherein the electrode assembly further comprises:
a first electrode tab disposed on the first electrode plate at the innermost portion of the electrode assembly; and
an adhesive tape comprising a first portion disposed on the first electrode plate at the innermost portion of the electrode assembly,
the first portion having a first end portion extending inside of the electrode assembly and being provided between the first electrode tab and the second electrode plate,
the adhesive tape having a second portion disposed on an outer surface of the electrode assembly,
and no second electrode plate being disposed between the first portion and the first electrode tab.

12. The battery according to claim 11, wherein the first electrode tab comprises a plurality of first electrode tab units, and the plurality of first electrode tab units comprises an innermost first electrode tab unit adjacent to the adhesive tape; and no second electrode plate is disposed between the adhesive tape and the innermost first electrode tab unit.

13. The battery according to claim 12, wherein an orthographic projection of the adhesive tape covers an orthographic projection of the first electrode tab in a thickness direction of the electrode assembly.

14. The battery according to claim 11, wherein the first electrode tab comprises a plurality of first electrode tab units disposed in a stack, and the plurality of first electrode tab units comprises an innermost first electrode tab unit adjacent to the adhesive tape;
no second electrode plate is disposed between the adhesive tape and the innermost first electrode tab unit; and
a width of the adhesive tape is greater than a width of the first electrode tab in a width direction of the electrode assembly.

15. The battery according to claim 11, wherein the first electrode tab comprises a plurality of first electrode tab units disposed in a stack, and the plurality of first electrode tab units comprises an innermost first electrode tab unit adjacent to the adhesive tape.

16. The battery according to claim 15, wherein the second portion partially overlaps the first portion.

17. The battery according to claim 11, wherein the adhesive tape at least partially covers the first electrode tab in a length direction of the electrode assembly.

18. The battery according to claim 11, wherein the first electrode plate is disposed between the adhesive tape and the first electrode tab.

19. The battery according to claim 11, wherein the first electrode tab comprises a tail segment extending beyond the electrode assembly and used for soldering to an adapter electrode tab, wherein the tail segment extends in a thickness direction of the electrode assembly; and the adhesive tape covers the tail segment.

20. The battery according to claim 11, wherein the first electrode plate is either one of a cathode plate or an anode plate, and the second electrode plate is the other of the cathode plate or the anode plate.

* * * * *